(12) United States Patent
Saito et al.

(10) Patent No.: US 11,777,333 B2
(45) Date of Patent: Oct. 3, 2023

(54) BACKUP POWER STORAGE SYSTEM WITH REMOVABLE SECONDARY BATTERY, AND METHOD OF OPERATING SAME

(71) Applicant: FDK CORPORATION, Tokyo (JP)

(72) Inventors: Yosuke Saito, Tokyo (JP); Kiyotaka Kumamoto, Tokyo (JP)

(73) Assignee: FDK CORPORATION, Tokyo (JP)

( * ) Notice: Subject to any disclaimer, the term of this patent is extended or adjusted under 35 U.S.C. 154(b) by 171 days.

(21) Appl. No.: 17/274,371

(22) PCT Filed: Aug. 30, 2019

(86) PCT No.: PCT/JP2019/034160
§ 371 (c)(1),
(2) Date: Mar. 8, 2021

(87) PCT Pub. No.: WO2020/066460
PCT Pub. Date: Apr. 2, 2020

(65) Prior Publication Data
US 2022/0052543 A1 Feb. 17, 2022

(30) Foreign Application Priority Data
Sep. 26, 2018 (JP) .................. 2018-180877

(51) Int. Cl.
*H02J 7/00* (2006.01)
*H01M 10/44* (2006.01)
(Continued)

(52) U.S. Cl.
CPC ......... *H02J 7/00712* (2020.01); *H01M 10/44* (2013.01); *H01M 10/46* (2013.01);
(Continued)

(58) Field of Classification Search
CPC .. H02J 7/00712; H02J 7/0048; H02J 2207/20; H01M 10/44; H01M 10/46; H01M 10/48
(Continued)

(56) References Cited

U.S. PATENT DOCUMENTS

2008/0309402 A1* 12/2008 Ozimek ............ H01J 37/32091
327/593
2015/0123480 A1* 5/2015 Xu ........................ H02J 7/0068
307/66
(Continued)

FOREIGN PATENT DOCUMENTS

| CN | 106134033 A | 11/2016 |
|---|---|---|
| EP | 3089236 A1 | 11/2016 |

(Continued)

OTHER PUBLICATIONS

Extended European Search Report dated Jun. 15, 2022, for corresponding European Application No. 19866482.3.
(Continued)

*Primary Examiner* — Nathaniel R Pelton
(74) *Attorney, Agent, or Firm* — Kinney & Lange, P.A.

(57) ABSTRACT

A voltage adjuster has: a current path connecting one end on an input/output terminal side and the other end on a secondary battery side; a bypass path of the current path; a converter provided in the bypass path and capable of changing input electric power to a predetermined voltage corresponding to the secondary battery or a predetermined voltage corresponding to an external device in accordance with the charge or discharge of the second battery; and a path selector configured to select a path to be used out of the current path or the bypass path in accordance with the charge or discharge of the secondary battery.

14 Claims, 17 Drawing Sheets

(51) Int. Cl.
H01M 10/46 (2006.01)
H01M 10/48 (2006.01)

(52) U.S. Cl.
CPC .......... H01M 10/48 (2013.01); H02J 7/0048 (2020.01); H02J 2207/20 (2020.01)

(58) Field of Classification Search
USPC ....................................................... 320/134
See application file for complete search history.

(56) References Cited

U.S. PATENT DOCUMENTS

| 2016/0064962 | A1* | 3/2016 | Huang | H02J 7/0071 |
| | | | | 324/427 |
| 2016/0064963 | A1 | 3/2016 | Huang et al. | |
| 2016/0315490 | A1* | 10/2016 | Xu | H02J 7/342 |
| 2017/0163058 | A1 | 6/2017 | Baumgartner | |

FOREIGN PATENT DOCUMENTS

| GB | 2332105 A | 6/1999 |
| JP | 20042888537 A | 10/2004 |
| WO | 2015200437 A1 | 12/2015 |
| WO | 2016172189 A1 | 10/2016 |

OTHER PUBLICATIONS

International Search Report and Written Opinion dated Oct. 8, 2019, for corresponding PCT Application No. PCT/JP2019/034160.

* cited by examiner

BACKUP POWER STORAGE SYSTEM WITH REMOVABLE SECONDARY BATTERY, AND METHOD OF OPERATING SAME

CROSS-REFERENCE TO RELATED APPLICATION(S)

This application is the national phase of PCT Application No. PCT/JP2019/034160 filed on Aug. 30, 2019, which in turn claims priority to Japanese Application No. 2018-180877 filed on Sep. 26, 2018, both of which are incorporated by reference herein in their entireties.

TECHNICAL FIELD

The present disclosure relates to a battery unit, a power storage system, and a method for charging/discharging the battery unit.

BACKGROUND ART

For example, as disclosed in Patent Document 1 below, there is known a battery pack capable of charging a secondary battery, such as a nickel-cadmium battery or a nickel-metal hydride battery, by using an inexpensive charging power source for a lead battery. In the battery pack, a charging voltage supplied from the charging power source is stepped up and converted into a charging voltage corresponding to a nickel-cadmium battery or a nickel-metal hydride battery, so that the secondary battery can be charged with the converted charging voltage.

PRIOR ART DOCUMENT

Patent Document

Patent Document 1: Japanese Patent Laid-Open No. 2004-288537

SUMMARY

Meanwhile, since the battery pack is based on the premise of stepping up the charging voltage supplied from the charging power source to charge the secondary battery, the secondary battery cannot be charged simply with electric power supplied from the charging power source. Also, in the battery pack, an output voltage to be output from a discharging terminal has been determined, and hence, a device not corresponding to the output voltage cannot be connected. Furthermore, in the battery pack, a charging terminal and the discharging terminal are provided separately, thus causing a problem that the number of components increases.

The present disclosure has been made in consideration of such circumstances, and it is an object of the present disclosure to provide a battery unit, a power storage system, and a method for charging/discharging the battery unit, which are highly versatile compared to the conventional battery unit.

The present disclosure has been made in order to solve at least some of the problems described above and can be achieved as the following aspects.

A battery unit, a power storage system, and a method for charging/discharging the battery unit according to the present aspect include: a chargeable/dischargeable and removable secondary battery; an input/output terminal connected to an external power source or an external device; a charging path for inputting electric power, supplied from the external power source via the input/output terminal, to the secondary battery; a discharging path for outputting electric power, accumulated in the secondary battery, to the external device via the input/output terminal; a voltage adjuster that is provided in the charging path and the discharging path and is configured to adjust a charging voltage of the external power source to a predetermined voltage corresponding to the secondary battery to output electric power received as an input via the input/output terminal, or adjust an output voltage of the secondary battery to a predetermined voltage corresponding to the external device to output electric power received as an input from the secondary battery, to the external device via the input/output terminal; and a controller configured to control an operation of the voltage adjuster in accordance with charge or discharge of the secondary battery. The charging path and the discharging path are formed of common circuit wiring. The voltage adjuster has a current path connecting one end on the input/output terminal side and the other end on the secondary battery side, a bypass path of the current path, a converter provided in the bypass path and capable of changing input electric power to a predetermined voltage corresponding to the secondary battery or a predetermined voltage corresponding to the external device in accordance with the charge or discharge of the second battery, and a path selector configured to select a path to be used out of the current path or the bypass path in accordance with the charge or discharge of the secondary battery.

With the above configuration, the battery unit, the power storage system, and the method for charging/discharging the battery unit according to the present aspect can charge the secondary battery with the charging voltage that corresponds to the secondary battery. The battery unit, the power storage system, and the method for charging/discharging the battery unit according to the present aspect can output electric power accumulated in the secondary battery to the external device with the output voltage that corresponds to the external device. In the battery unit, the power storage system, and the method for charging/discharging the battery unit according to the present aspect, the charging path and the discharging path are formed of common circuit wiring, so that it is possible to simplify the circuit while preventing an increase in the number of components. Thus, the battery unit, the power storage system, and the method for charging/discharging the battery unit according to the present aspect are highly versatile compared to the conventional battery unit.

DETAILED DESCRIPTION

Hereinafter, a battery unit, a power storage system, and a method for charging/discharging the battery unit according to an embodiment of the present disclosure will be described with reference to the drawings. Note that the present embodiment is not limited to the content described below and can be implemented with arbitrary modifications within the scope of the gist thereof being unchanged. In addition, all the drawings used in the description of the embodiments schematically illustrate constituent members, are partially emphasized, enlarged, reduced, or omitted for better understanding, and may not accurately illustrate the scale or shape of the constituent members.

Figure 1:
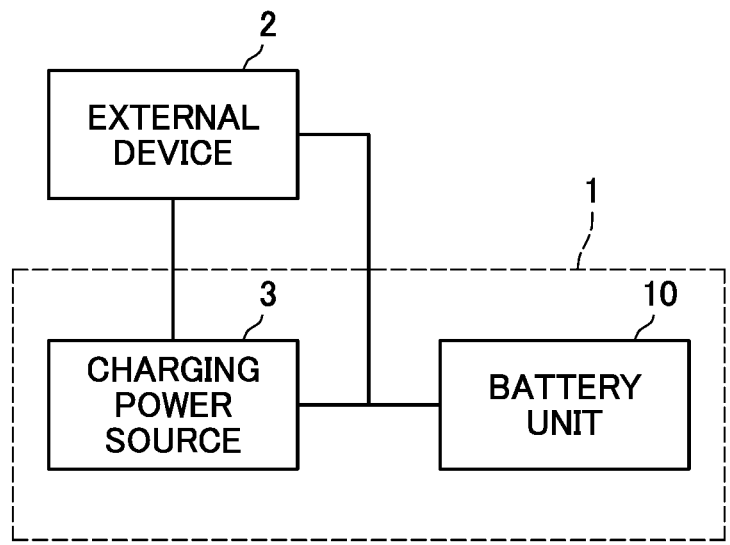
FIG. 1 is a block diagram illustrating a power storage system that includes a battery unit according to the present embodiment.

FIG. 1 is a block diagram illustrating a power storage system 1 that includes a battery unit 10 according to the present embodiment. The power storage system 1 according to the present embodiment is connected between an external device 2 and a power source such as a commercial power source (not illustrated), and is used as a backup power source, an emergency power source, and an uninterruptible power source for the external device 2. The power storage system 1 illustrated in FIG. 1 includes, for example, a battery unit 10 and a charging power source 3.

The battery unit 10 includes a chargeable/dischargeable and removable secondary battery 11 to be described later. The battery unit 10 charges the secondary battery 11 with electric power supplied from the charging power source 3. The battery unit 10 supplies the electric power accumulated in the secondary battery 11 to the external device 2, at the time of a power failure. Thus, the power storage system 1 according to the present embodiment can continue to supply electric power to the external device 2 even when electric power cannot be supplied from the charging power source 3 to the external device 2 due to the power failure. The charging power source 3 supplies electric power to the battery unit 10 or the external device 2. The charging power source 3 is, for example, a power source corresponding to a generally known secondary battery such as a lead battery or a nickel-metal hydride battery.

Figure 2:
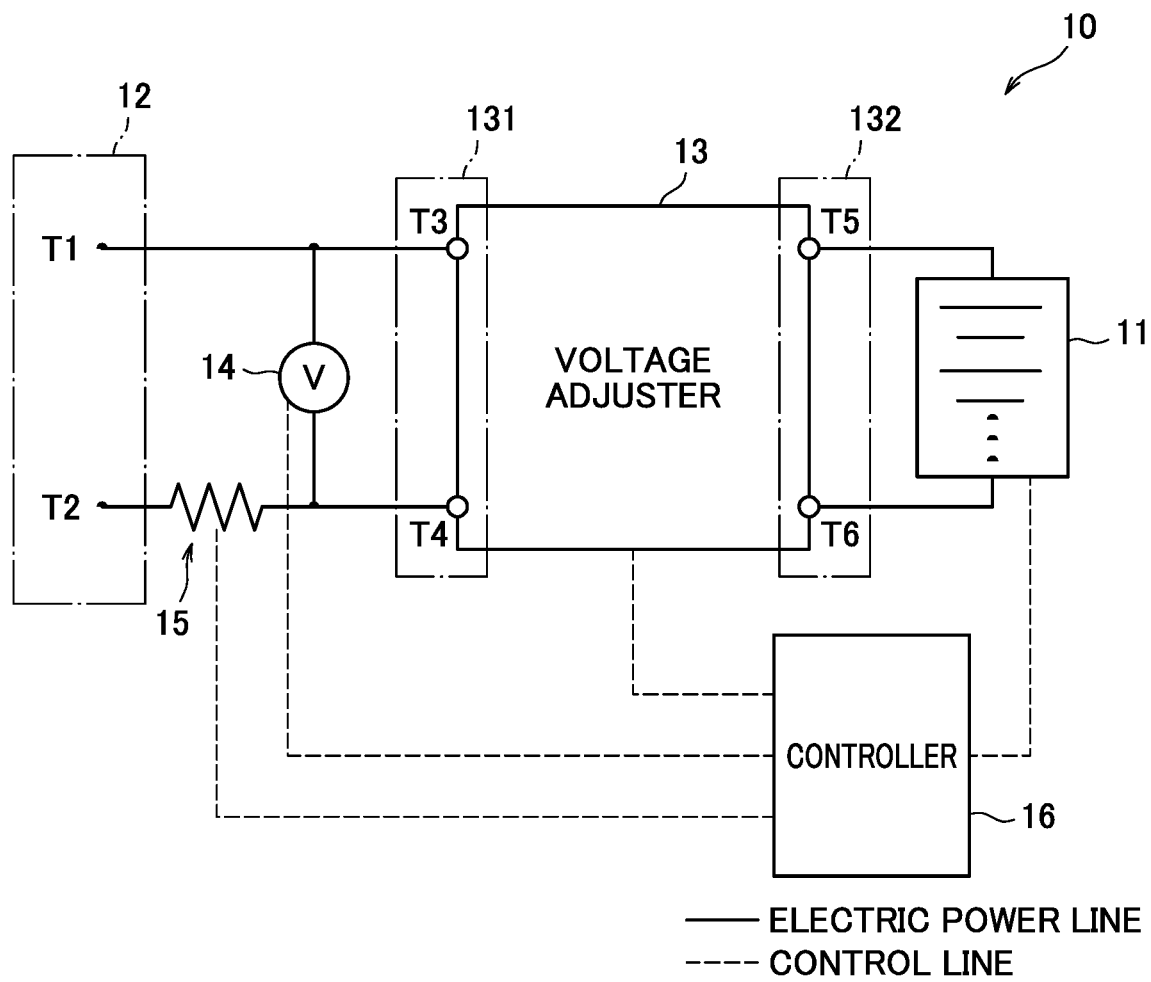
FIG. 2 is a circuit diagram of the battery unit illustrated in FIG. 1.

Here, the circuit configuration of the battery unit 10 will be described in detail. FIG. 2 is a circuit diagram of the battery unit 10 illustrated in FIG. 1. The battery unit illustrated in FIG. 2 includes the secondary battery 11, an input/output terminal 12, a voltage adjuster 13, a voltage detector 14, a current detection resistor 15, and a controller 16. The secondary battery 11 is, for example, a generally known secondary battery such as a lead battery or a nickel-metal hydride battery.

The input/output terminal 12 is connected to the charging power source 3 and is used to input electric power, supplied from the charging power source 3, to the secondary battery 11. Also, the input/output terminal 12 is connected to the external device 2 and is used to output the electric power, accumulated in the secondary battery 11, to the external device at the time of a power failure.

The voltage adjuster 13 is provided between the input/output terminal 12 and the secondary battery 11. For example, one end 131 of the voltage adjuster 13 is connected to the input/output terminal 12. The other end 132 of the voltage adjuster 13 is connected to the secondary battery 11. Specifically, a positive electrode T3 at the one end 131 of the voltage adjuster 13 is connected to a positive electrode T1 of the input/output terminal 12. A negative electrode T4 at one end 131 of the voltage adjuster 13 is connected to a negative electrode T2 of the input/output terminal 12. A positive electrode T5 of the other end 132 of the voltage adjuster 13 is connected to the positive electrode of the secondary battery 11. A negative electrode T6 of the other end 132 of the voltage adjuster 13 is connected to the negative electrode of the secondary battery 11. Note that the negative electrode T2 of the input/output terminal 12 is grounded. That is, the voltage adjuster 13 is provided in a charging path for inputting the electric power, supplied from the charging power source 3 via the input/output terminal 12, to the secondary battery 11 and in a discharging path for outputting the electric power, accumulated in the secondary battery 11, to the external device 2 via the input/output terminal 12. Note that the charging path and the discharging path are formed of common circuit wiring.

The voltage adjuster 13 adjusts the charging voltage of the charging power source 3 to a predetermined voltage corresponding to the secondary battery 11 and outputs the electric power input from the charging power source 3 via the input/output terminal 12. The voltage adjuster 13 adjusts the output voltage of the secondary battery 11 to a predetermined voltage corresponding to the external device 2 and outputs the electric power received as an input from the secondary battery 11, to the external device 2 via the input/output terminal 12. Note that the internal configuration of the voltage adjuster 13 will be described later with reference to the drawings.

The voltage detector 14 detects an input voltage (charging voltage) input to the battery unit 10 and detects an output voltage output from the secondary battery 11. The voltage detector 14 transmits information on the detected input voltage and output voltage to the controller 16 to be described later. The current detection resistor 15 detects an input current (charging current) input to the battery unit 10 and an output current output from the secondary battery 11. The current detection resistor 15 transmits information on the detected input current and output current to the controller 16 to be described later.

The controller 16 includes a predetermined processor as a hardware resource. For example, the controller 16 controls the operation of the voltage adjuster 13 in accordance with the charge or discharge of the secondary battery 11. The controller 16 determines whether or not the charging power source 3 is operating normally based on the information on the input voltage received from the voltage detector 14 and the information on the input current received from the current detection resistor 15. The controller 16 determines whether or not the charging power source 3 has been restored based on the information on the output voltage received from the voltage detector 14 and the information on the output current received from the current detection resistor 15. Further, the controller 16 determines the state of charge and the degree of degradation of the secondary battery 11 based on information on temperature from a temperature detector (not illustrated) installed in the secondary battery 11.

Here, a specific circuit configuration of the voltage adjuster 13, the operation of the path selector 17 to be described later, and the current flow during charge and discharge will be described with reference to FIGS. 3 to 18. For preventing the drawings from becoming complex, the voltage detector 14, the current detection resistor 15, and the controller 16 are omitted from the drawings that explain the operation of the path selector 17 to be described later and the current flow during charge and discharge.

First Embodiment

Figure 3:
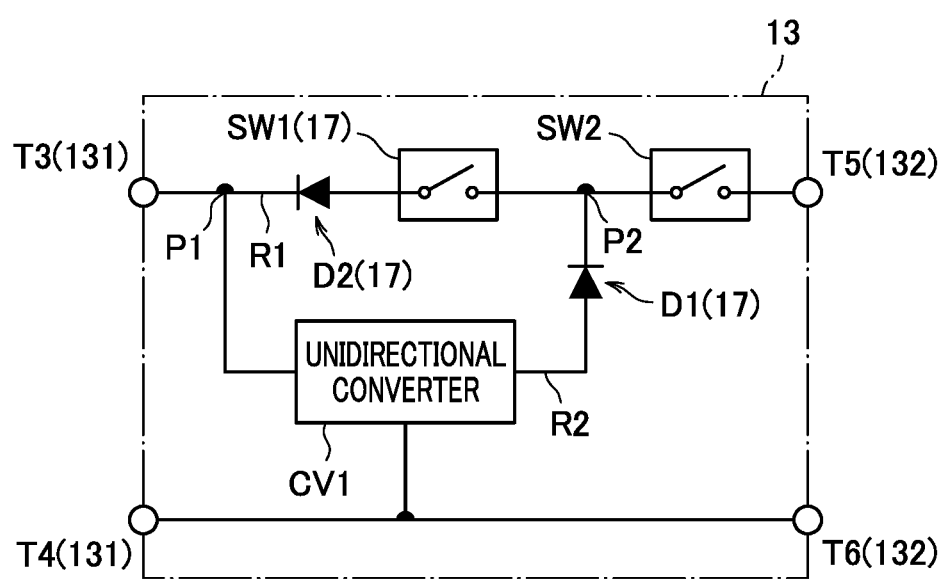
FIG. 3 is a circuit diagram of a voltage adjuster in the first embodiment.

FIG. 3 is a circuit diagram of the voltage adjuster 13 in a first embodiment. The voltage adjuster 13 in the first embodiment has a current path R1 connecting the one end 131 on the input/output terminal 12 side and the other end 132 on the secondary battery 11 side, and a bypass path R2 of the current path R1. The voltage adjuster 13 has a converter CV1 provided in the bypass path R2 and capable of changing the input electric power to the predetermined voltage corresponding to the secondary battery 11, or to the predetermined voltage corresponding to the external device 2, in accordance with the charge or discharge of the secondary battery 11. The converter CV1 in the first embodiment is a unidirectional converter capable of changing the input electric power to the predetermined voltage corresponding to the secondary battery 11. For example, the unidirectional converter is a step-up converter, a step-down converter, or a variable converter capable of step-up or step-down. The unidirectional converter is a non-insulated or insulated unidirectional converter.

The voltage adjuster 13 has a path selector 17. The path selector 17 selects a path to be used out of the current path R1 and the bypass path R2 in accordance with the charge or discharge of the secondary battery 11. The path selector 17 in the first embodiment is made up of a first diode D1, a second diode D2, and a switching element SW1. The first diode D1 is provided in the bypass path R2 and has an anode connected to the input/output terminal 12 side and a cathode connected to the secondary battery 11 side. The second diode D2 is provided in the current path R1 between a branching point P1 of the current path R1 and the bypass path R2 and a converging point P2 of the current path R1 and the bypass path R2, and has an anode connected to the secondary battery 11 side and a cathode connected to the input/output terminal 12 side. The switching element SW1 is provided in the current path R1 between the branching point P1 and the converging point P2. A switching element SW2 is provided between the converging point P2 and the other end 132. For example, the first diode D1 and the second diode D2 serve to separate the charging path and the discharging path by limiting the direction in which the current flows. The switching element SW1 serves to prevent the reverse flow of the charging current from the converging point P2 to the input/output terminal 12 side when the secondary battery 11 is charged. The switching element SW2 serves to stop the charging operation or the discharging operation when a failure occurs in the battery unit 10. For each of the switching elements SW1, SW2, one generally used as a switching element, such as a bipolar transistor or a field-effect transistor (FET), is used.

Figure 4:
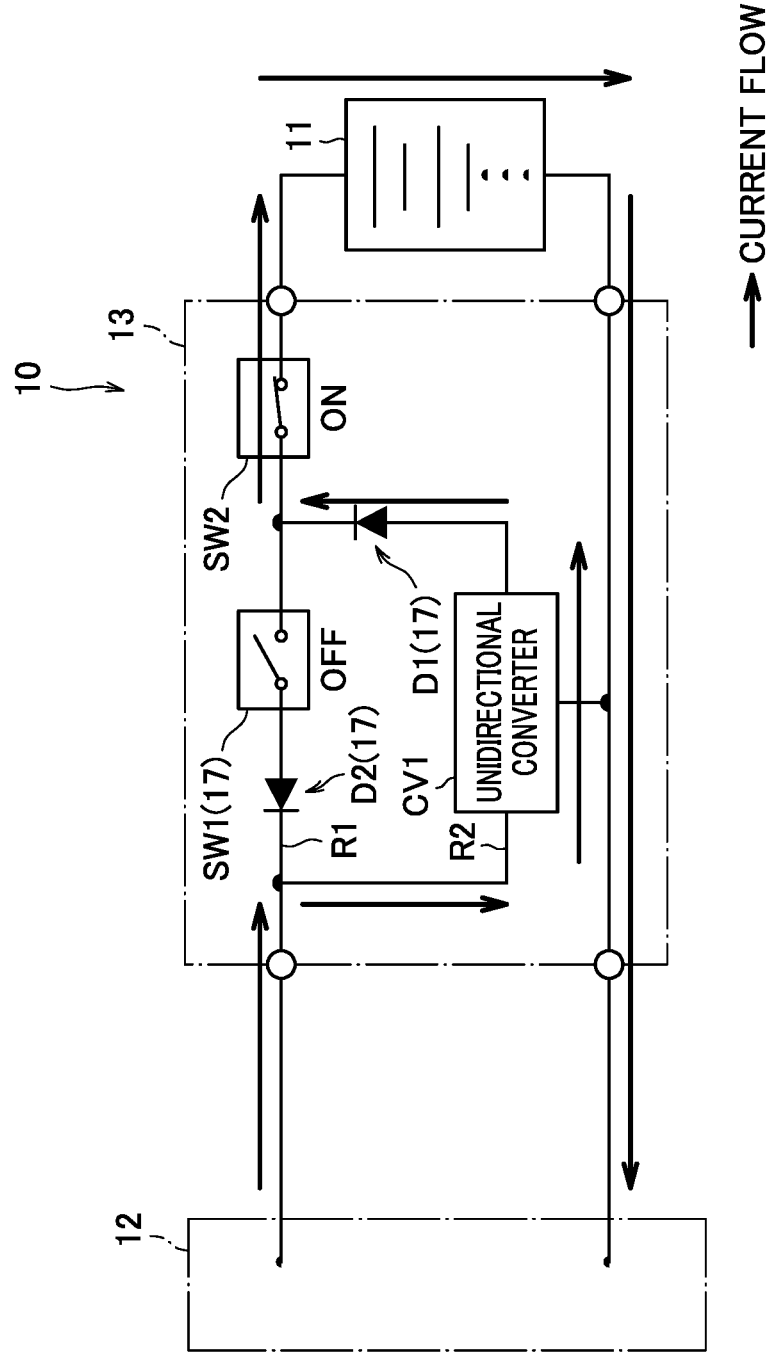
FIG. 4 is a diagram illustrating an operation of a path selector and the flow of a charging current when a secondary battery is charged in the voltage adjuster in the first embodiment.

FIG. 4 is a diagram illustrating the operation of the path selector 17 and the flow of the charging current when the secondary battery 11 is charged in the voltage adjuster 13 in the first embodiment. As illustrated in FIG. 4, in the case of charging the secondary battery 11, the controller 16 turns off the switching element SW1 and turns on the switching element SW2. As a result, as illustrated in FIG. 4, the charging current is input from the input/output terminal 12 to the secondary battery 11 through the bypass path R2. At this time, when the charging voltage of the charging power source 3 does not correspond to the secondary battery 11, the controller 16 operates the converter CV1. Thus, the voltage adjuster 13 in the first embodiment can adjust the charging voltage of the charging power source 3 to the predetermined voltage corresponding to the secondary battery 11.

That is, the battery unit 10 in the first embodiment can charge the secondary battery 11 with the charging voltage that corresponds to the secondary battery 11. For example, assuming that the charging power source 3 is a charging power source for a lead battery and that the secondary battery 11 is a lead battery, the charging voltage corresponds to the secondary battery 11, and the charging voltage does not need to be converted by the converter CV1. Hence, the battery unit 10 does not adjust the charging voltage by using the converter CV1 of the voltage adjuster 13 but inputs the electric power, supplied from the charging power source 3 via the input/output terminal 12, to the secondary battery 11. Assuming that the charging power source 3 is a charging power source for a lead battery and that the secondary battery 11 is a nickel-metal hydride battery, the charging voltage does not correspond to the secondary battery 11, and the charging voltage needs to be converted by the converter CV1. Hence, the battery unit 10 adjusts the charging voltage to the predetermined voltage corresponding to the secondary battery 11 by using the converter CV1 of the voltage adjuster 13 and inputs the electric power, supplied from the charging power source 3 through the input/output terminal 12, to the secondary battery 11. Thereby, the battery unit 10 in the first embodiment can charge the secondary battery 11 with the charging voltage that corresponds to the secondary battery 11. Further, assuming that the converter CV1 is an insulated unidirectional converter, even when a large amount of noise is contained in the electric power input from the input/output terminal 12, passing through the converter CV1 can allow the noise to be removed.

Figure 5:
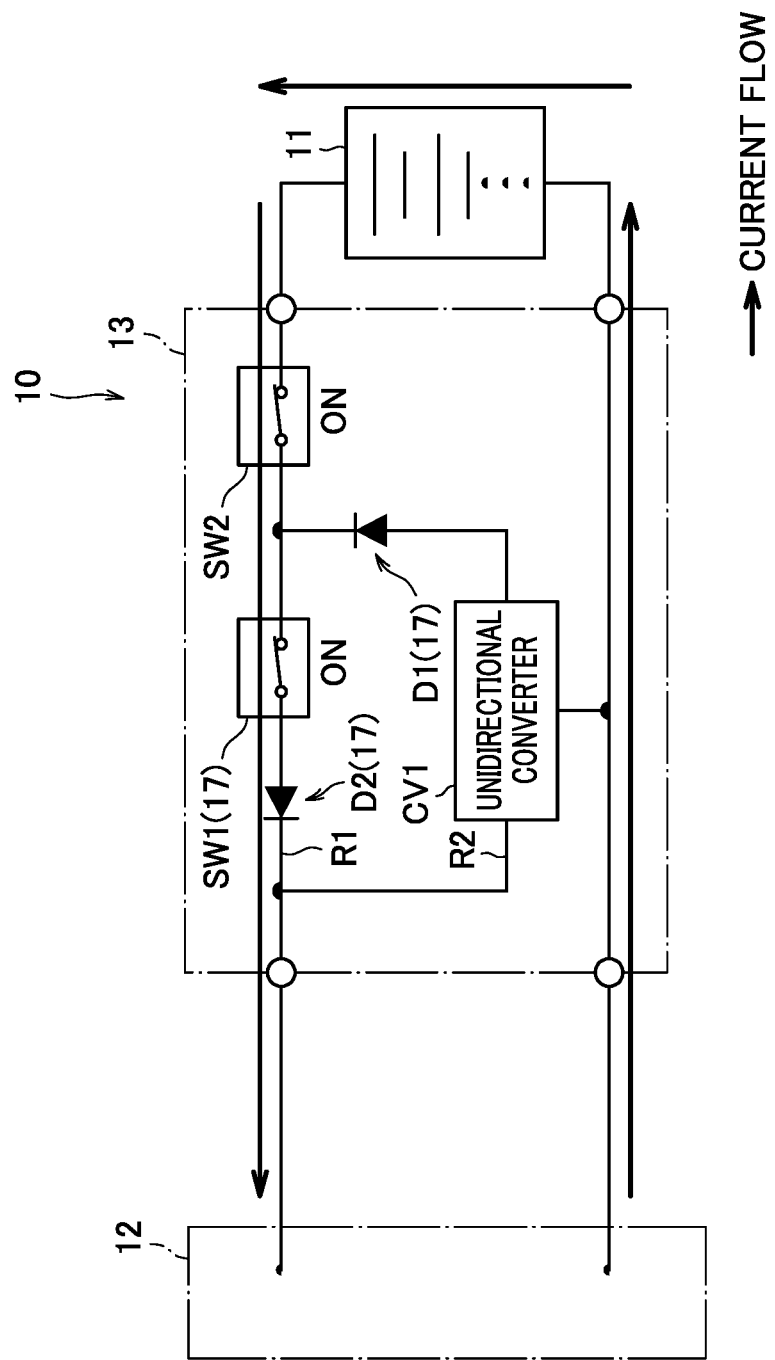
FIG. 5 is a diagram illustrating the operation of the path selector and the flow of an output current when electric power is output from the secondary battery to the external device in the voltage adjuster in the first embodiment.

FIG. 5 is a diagram illustrating the operation of the path selector 17 and the flow of the output current when the electric power is output from the secondary battery 11 to the external device 2 in the voltage adjuster 13 in the first embodiment. As illustrated in FIG. 5, in the case of outputting the electric power accumulated in the secondary battery 11 to the external device 2, the controller 16 turns on the switching elements SW1, SW2. Thus, the battery unit 10 in the first embodiment can output the electric power accumulated in the secondary battery 11 to the external device 2 through the current path R1.

Second Embodiment

Figure 6:
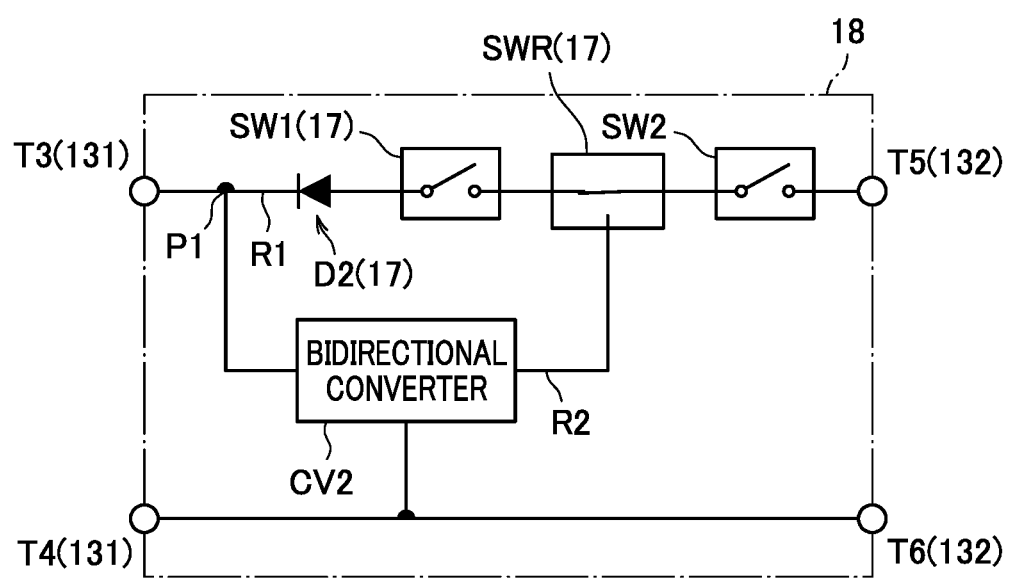
FIG. 6 is a circuit diagram of a voltage adjuster in a second embodiment.

FIG. 6 is a circuit diagram of a voltage adjuster 18 according to a second embodiment. The voltage adjuster 18 in the second embodiment is formed by removing the first diode D1 from the voltage adjuster 13 in the first embodiment and providing a relay switch SWR at the converging point P2 of the current path R1 and the bypass path R2. In the case of outputting the electric power accumulated in the secondary battery 11 to the external device 2, the relay switch SWR serves to allow a path used as a discharging path to be selected out of the current path R1 and the bypass path R2. The relay switch SWR, together with the second diode D2, serves to separate the charging path and the discharging path. The converter CV2 in the second embodiment is a bidirectional converter capable of changing the input electric power to the predetermined voltage corresponding to the secondary battery 11 or the predetermined voltage corresponding to the external device 2. For example, the bidirectional converter is a non-insulated or insulated bidirectional converter. The path selector 17 in the second embodiment is assumed to be made up of the second diode D2, the relay switch SWR, and the switching element SW1. Note that the other configurations are the same as those of the voltage adjuster 13 in the first embodiment.

Figure 7:
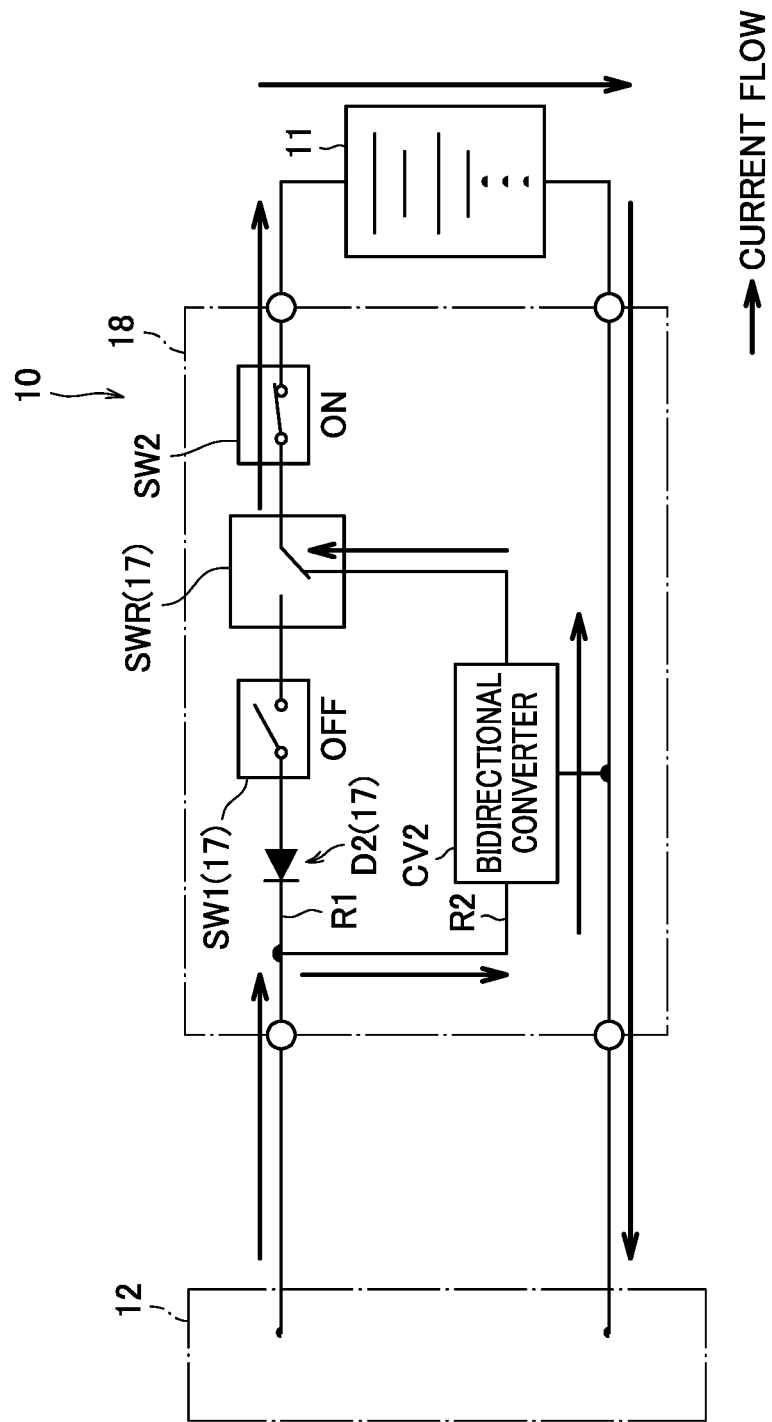
FIG. 7 is a diagram illustrating an operation of a path selector and the flow of a charging current when the secondary battery is charged in the voltage adjuster in the second embodiment.

FIG. 7 is a diagram illustrating the operation of the path selector 17 and the flow of the charging current when the secondary battery 11 is charged in the voltage adjuster 18 in the second embodiment. As illustrated in FIG. 7, in the case of charging the secondary battery 11, the controller 16 turns off the switching element SW1 and turns on the switching element SW2. Further, the controller 16 switches the relay switch SWR to the bypass path R2 side. As a result, as illustrated in FIG. 7, the charging current is input from the input/output terminal 12 to the secondary battery 11 through the bypass path R2. At this time, when the charging voltage of the charging power source 3 does not correspond to the secondary battery 11, the controller 16 operates the converter CV2. Thus, the voltage adjuster 18 in the second embodiment can adjust the charging voltage of the charging power source 3 to the predetermined voltage corresponding to the secondary battery 11. That is, as in the first embodiment, the battery unit 10 in the second embodiment can charge the secondary battery 11 with the charging voltage that corresponds to the secondary battery 11. Further, assuming that the converter CV2 is an insulated bidirectional converter, even when a large amount of noise is contained in the electric power input from the input/output terminal 12, passing through the bypass path R2 can allow the noise to be removed by the converter CV2.

Figure 8:
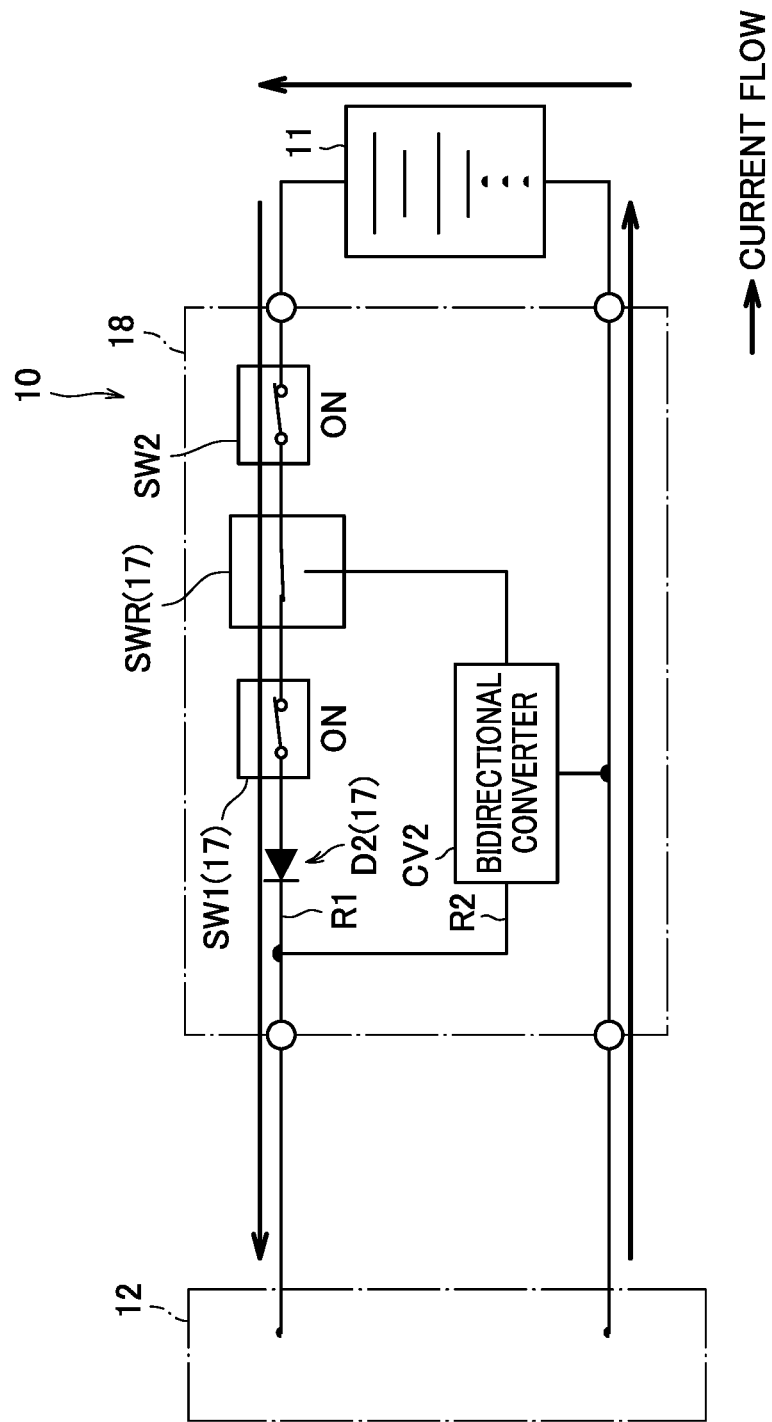
FIG. 8 is a diagram illustrating the operation of the path selector and the flow of an output current when electric power is output from the secondary battery to the external device by using a current path in the voltage adjuster in the second embodiment.

FIG. 8 is a diagram illustrating the operation of the path selector 17 and the flow of the output current when the electric power is output from the secondary battery 11 to the external device 2 by using the current path R1 in the voltage adjuster 18 in the second embodiment. As illustrated in FIG. 8, in the case of outputting the electric power accumulated in the secondary battery 11 to the external device 2, the controller 16 turns on the switching elements SW1, SW2. Further, the controller 16 switches the relay switch SWR to the current path R1 side. Thus, the battery unit 10 in the second embodiment can output the electric power accumulated in the secondary battery 11 to the external device 2 through the current path R1.

Figure 9:
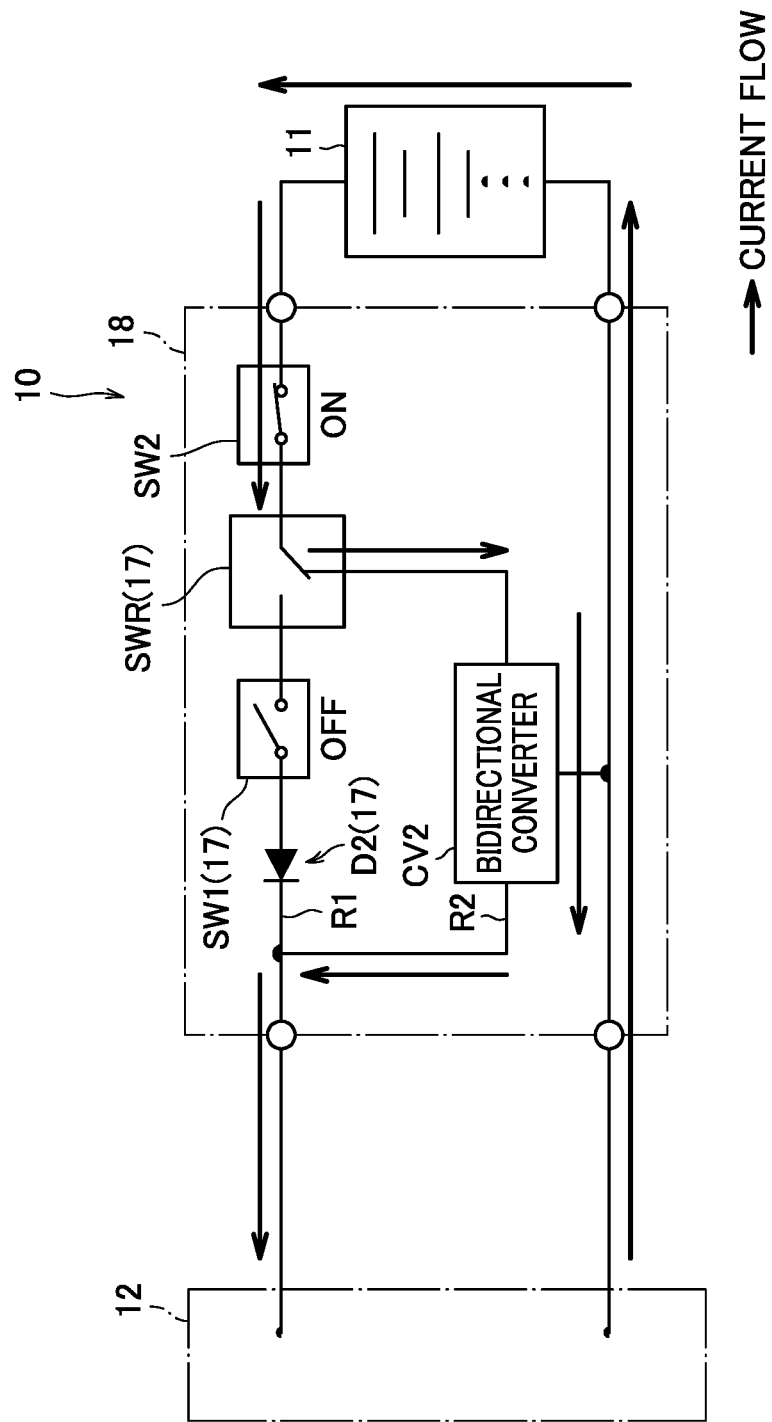
FIG. 9 is a diagram illustrating the operation of the path selector and the flow of the output current when the electric power is output from the secondary battery to the external device by using a bypass path in the voltage adjuster in the second embodiment.

FIG. 9 is a diagram illustrating the operation of the path selector 17 and the flow of the output current when the electric power is output from the secondary battery 11 to the external device 2 by using the bypass path R2 in the voltage adjuster 18 in the second embodiment. As illustrated in FIG. 9, the controller 16 turns off the switching element SW1 and turns on the switching element SW2. Further, the controller 16 switches the relay switch SWR to the bypass path R2 side. Thus, the battery unit 10 in the second embodiment can output the electric power accumulated in the secondary battery 11 to the external device 2 through the bypass path R2. At this time, when the external device 2 does not correspond to the output voltage of the secondary battery 11, the controller 16 operates the converter CV2. Thus, the battery unit 10 in the second embodiment can adjust the charging voltage of the charging power source 3 to the predetermined voltage corresponding to the secondary battery 11 through the bypass path R2.

That is, the battery unit 10 in the second embodiment can output the electric power accumulated in the secondary battery 11 to the external device 2 with the output voltage that corresponds to the external device 2. For example, assuming that the secondary battery 11 is a nickel-metal hydride battery and that the external device 2 corresponds to the output voltage of the nickel-metal hydride battery, the output voltage does not need to be converted by the converter CV2. Hence, the battery unit 10 outputs the electric power accumulated in the secondary battery 11 to the external device 2 through the current path R1. Further, assuming that the secondary battery 11 is a nickel-metal hydride battery and that the external device 2 does not correspond to the output voltage of the nickel-metal hydride battery, the output voltage needs to be converted by the converter CV2. Hence, the battery unit 10 adjusts the output voltage to the predetermined voltage corresponding to the external device 2 by using the converter CV2 through the bypass path R2 and outputs the electric power accumulated in the secondary battery 11 to the external device 2. Thus, the battery unit 10 in the second embodiment can output the electric power accumulated in the secondary battery 11 to the external device 2 with the output voltage that corresponds to the external device 2.

In the battery unit 10 in the second embodiment, assuming that the converter CV2 is an insulated bidirectional converter, even when a large amount of noise is contained in the electric power output from the secondary battery 11, passing through the converter CV2 can allow the noise to be removed. For example, when the electric power output from the secondary battery 11 contains a large amount of noise, there is a possibility that a trouble such as a failure or a defect occurs in the external device 2. Hence, the battery unit 10 removes the noise by using the converter CV2 of the voltage adjuster 18 through the bypass path R2 and outputs the electric power accumulated in the secondary battery 11 to the external device 2. That is, in the battery unit 10 in the second embodiment, even when a large amount of noise is contained in the electric power output from the secondary battery 11, passing through the converter CV2 can allow the noise to be removed. When the electric power output from the secondary battery 11 does not contain noise, in order to minimize power loss, the battery unit 10 outputs the electric power accumulated in the secondary battery 11 to the external device 2 through the current path R1.

Third Embodiment

Figure 10:
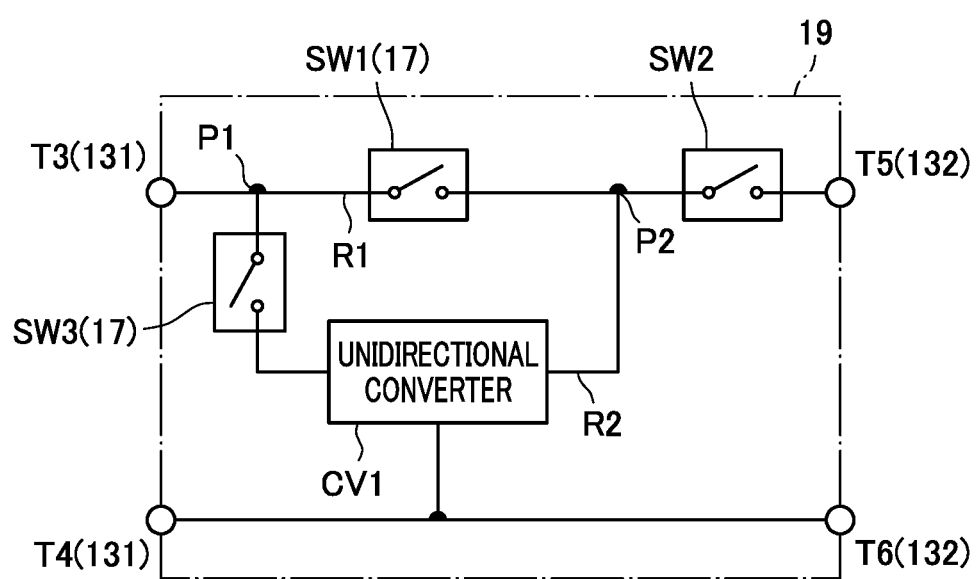
FIG. 10 is a circuit diagram of a voltage adjuster in a third embodiment.

FIG. 10 is a circuit diagram of a voltage adjuster 19 according to a third embodiment. The voltage adjuster 19 in the third embodiment is formed by removing the first diode D1 and the second diode D2 from the voltage adjuster 13 in the first embodiment and further providing a switching element SW3 between the converter CV1 and the branching point P1 of the current path R1 and the bypass path R2. The switching element SW3, together with the switching element SW1, serves to separate the charging path and a discharging path. The converter CV1 in the third embodiment is a unidirectional converter. The path selector 17 in the third embodiment is assumed to be made up of the switching element SW1 and the switching element SW3. For the switching element SW3, similarly to the switching elements SW1, SW2, one generally used as a switching element, such as a bipolar transistor or an FET, is used.

Figure 11:
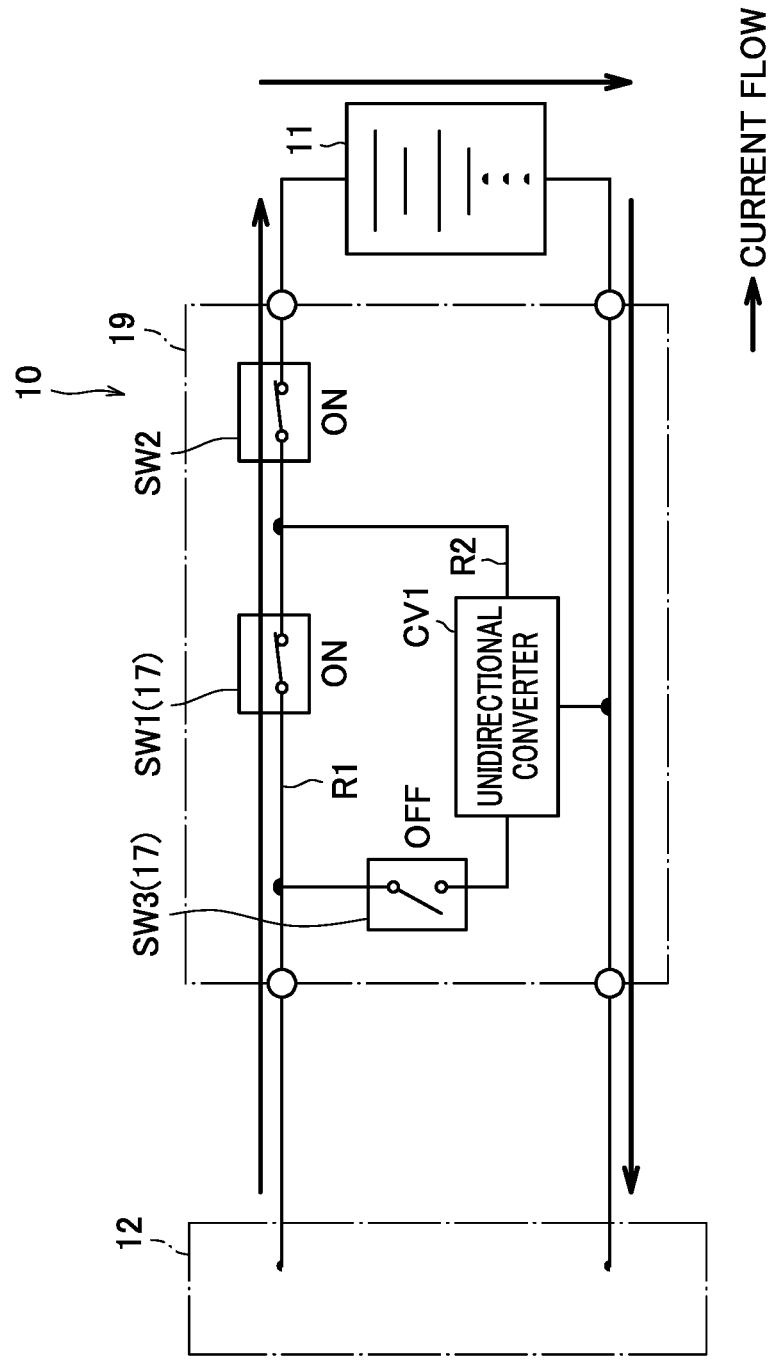
FIG. 11 is a diagram illustrating an operation of a path selector and the flow of a charging current when the secondary battery is charged by using a current path in the voltage adjuster in the third embodiment.

FIG. 11 is a diagram illustrating the operation of the path selector 17 and the flow of the charging current when the secondary battery 11 is charged by using the current path R1 in the voltage adjuster 19 in the third embodiment. As illustrated in FIG. 11, in the case of charging the secondary battery 11 by using the current path R1, the controller 16 turns on the switching elements SW1, SW2 and turns off the switching element SW3. As a result, as illustrated in FIG. 11, the charging current is input from the input/output terminal 12 to the secondary battery 11 through the current path R1.

Figure 12:
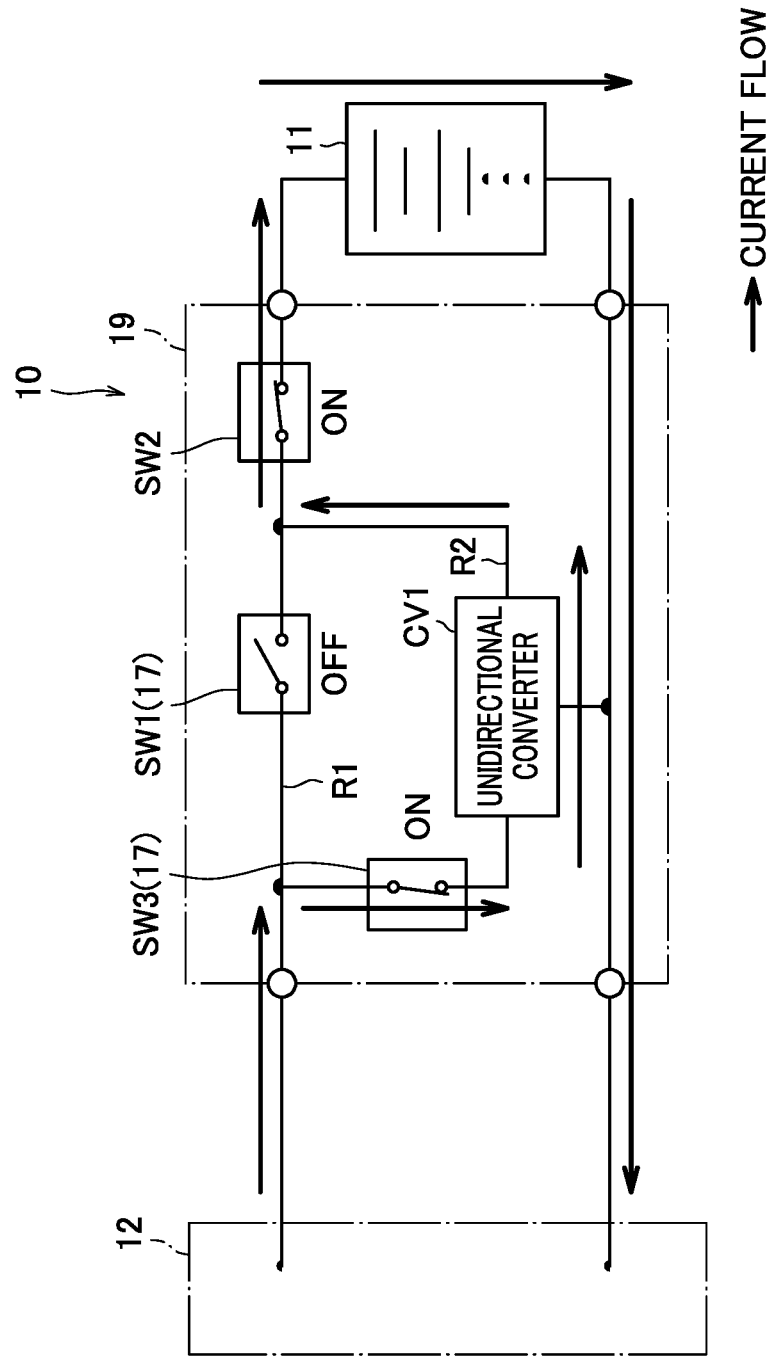
FIG. 12 is a diagram illustrating the operation of the path selector and the flow of the charging current when the secondary battery is charged by using a bypass path in the voltage adjuster in the third embodiment.

FIG. 12 is a diagram illustrating the operation of the path selector 17 and the flow of the charging current when the secondary battery 11 is charged by using the bypass path R2 in the voltage adjuster 19 in the third embodiment. As illustrated in FIG. 12, in the case of charging the secondary battery 11 by using the bypass path R2, the controller 16 turns off the switching element SW1 and turns on the switching elements SW2, SW3. As a result, as illustrated in FIG. 12, the charging current is input from the input/output terminal 12 to the secondary battery 11 through the bypass path R2. At this time, when the charging voltage of the charging power source 3 does not correspond to the secondary battery 11, the controller 16 operates the converter CV1. Thus, the voltage adjuster 19 in the third embodiment can adjust the charging voltage of the charging power source 3 to the predetermined voltage corresponding to the secondary battery 11. That is, as in the first and second embodiments, the battery unit 10 in the third embodiment can charge the secondary battery 11 with the charging voltage that corresponds to the secondary battery 11.

In the battery unit 10 of the third embodiment, as in those of the first and second embodiments, assuming that the converter CV1 is an insulated unidirectional converter, even when a large amount of noise is contained in the electric power input from the input/output terminal 12, the noise can be removed by the electric power passing through the converter CV1. For example, when the electric power supplied from the charging power source 3 via the input/output terminal 12 contains a large amount of noise, there is a possibility that a trouble such as a failure or a defect occurs inside the battery unit 10. Hence, the battery unit 10 removes the noise by using the converter CV1 of the voltage adjuster 18 through the bypass path R2 and inputs the electric power, supplied from the charging power source 3 via the input/output terminal 12, to the secondary battery 11. That is, in the battery unit 10 in the third embodiment, even when a large amount of noise is contained in the electric power input from the input/output terminal 12, the noise can be removed by the electric power passing through the converter CV1. Note that when the electric power supplied from the charging power source 3 does not contain noise, in order to minimize power loss, the battery unit 10 inputs the electric power, supplied from the charging power source 3 via the input/output terminal 12, to the secondary battery 11 through the current path R1.

Figure 13:
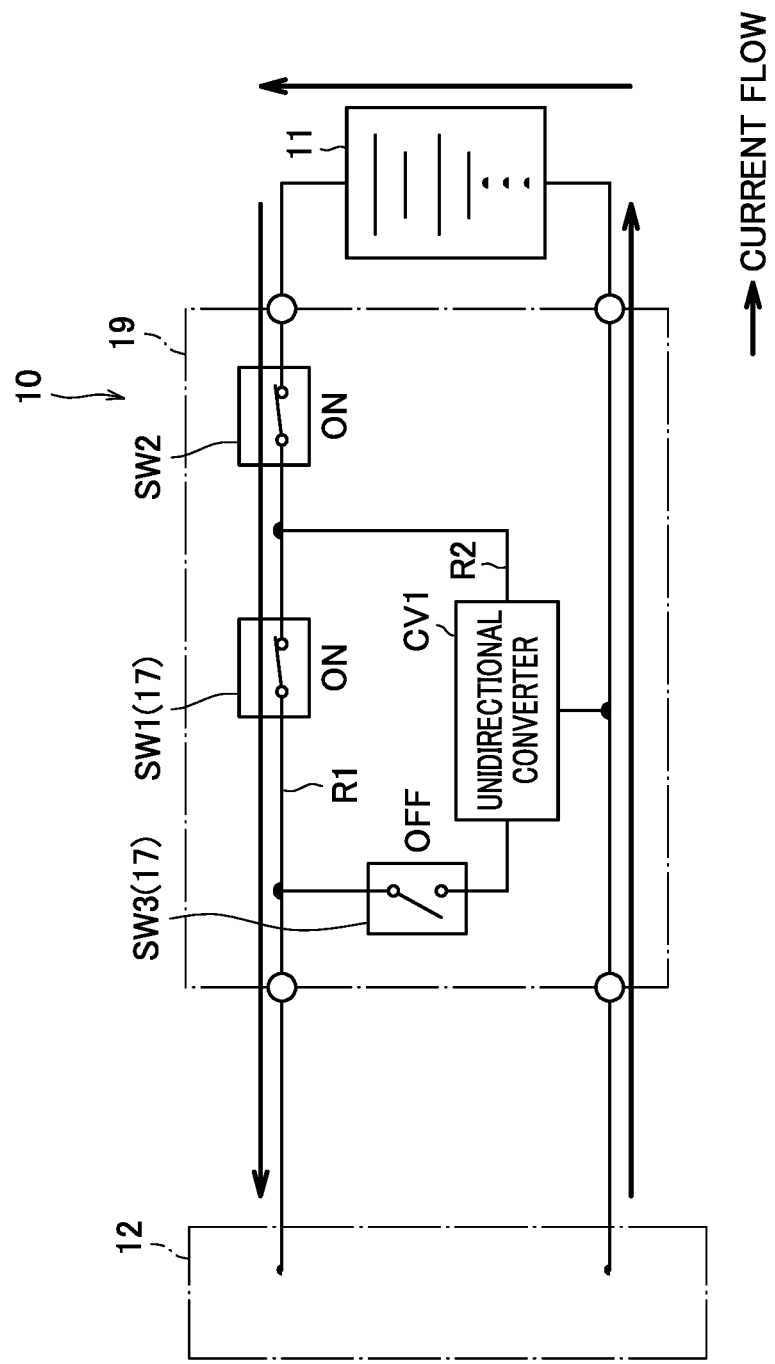
FIG. 13 is a diagram illustrating the operation of the path selector and the flow of an output current when electric power is output from the secondary battery to the external device in the voltage adjuster in the third embodiment.

FIG. 13 is a diagram illustrating the operation of the path selector 17 and the flow of the output current when the electric power is output from the secondary battery 11 to the external device 2 in the voltage adjuster 19 in the third embodiment. As illustrated in FIG. 13, in the case of outputting the electric power accumulated in the secondary battery 11 to the external device 2, the controller 16 turns on the switching elements SW1, SW2 and turns off the switching element SW3. Thus, as in the first embodiment, the battery unit 10 in the third embodiment can output the electric power accumulated in the secondary battery 11 to the external device 2 through the current path R1.

Fourth Embodiment

Figure 14:
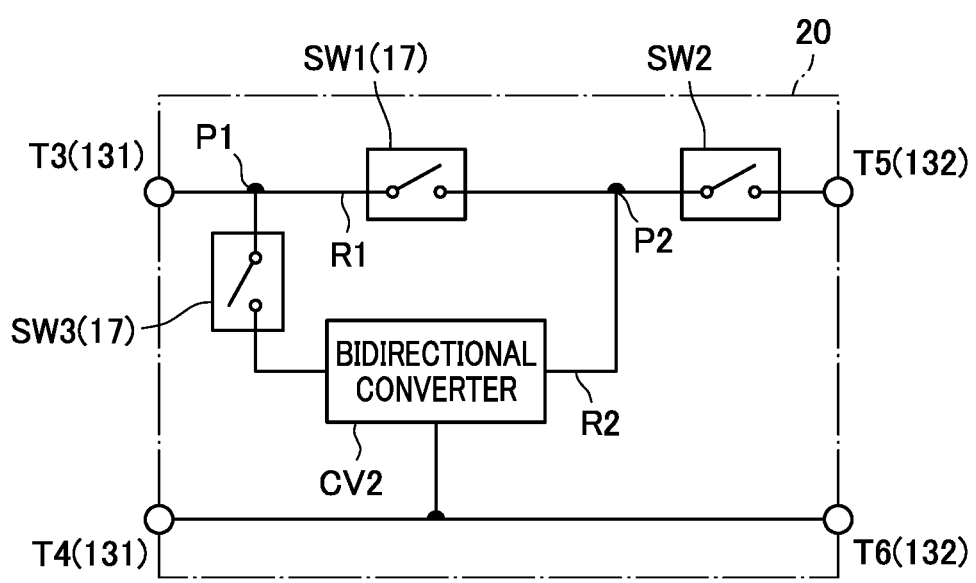
FIG. 14 is a circuit diagram of a voltage adjuster in a fourth embodiment.

FIG. 14 is a circuit diagram of a voltage adjuster 20 according to a fourth embodiment. The voltage adjuster 20 in the fourth embodiment is formed by replacing the unidirectional converter of the voltage adjuster 19 in the third embodiment with a bidirectional converter. Note that the other configurations are the same as those of the voltage adjuster 19 in the third embodiment.

Figure 15:
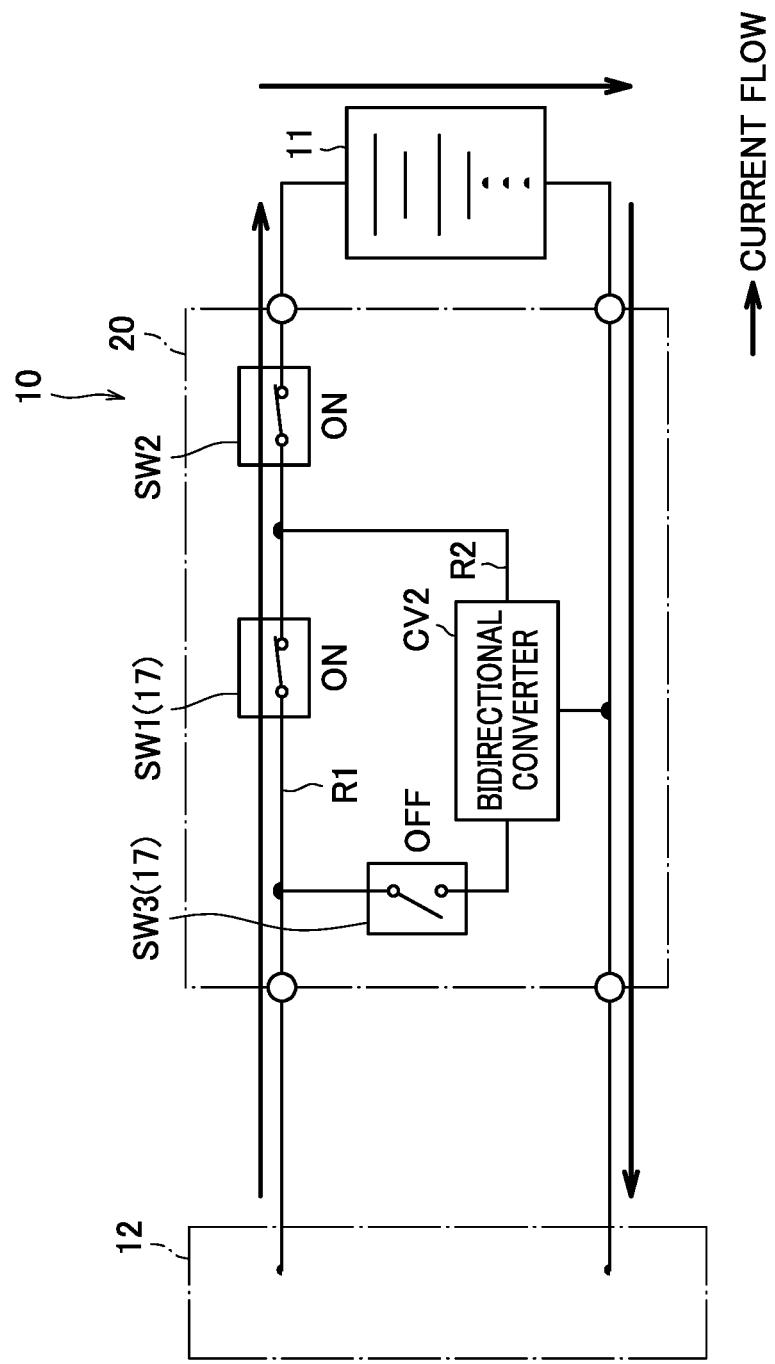
FIG. 15 is a diagram illustrating an operation of a path selector and the flow of a charging current when the secondary battery is charged by using a current path in the voltage adjuster in the fourth embodiment.

FIG. 15 is a diagram illustrating the operation of the path selector 17 and the flow of the charging current when the secondary battery 11 is charged by using the current path R1 in the voltage adjuster 20 in the fourth embodiment. As illustrated in FIG. 15, in the case of charging the secondary battery 11 by using the current path R1, the controller 16 turns on the switching elements SW1, SW2 and turns off the switching element SW3. As a result, as illustrated in FIG. 15, the charging current is input from the input/output terminal 12 to the secondary battery 11 through the current path R1.

Figure 16:
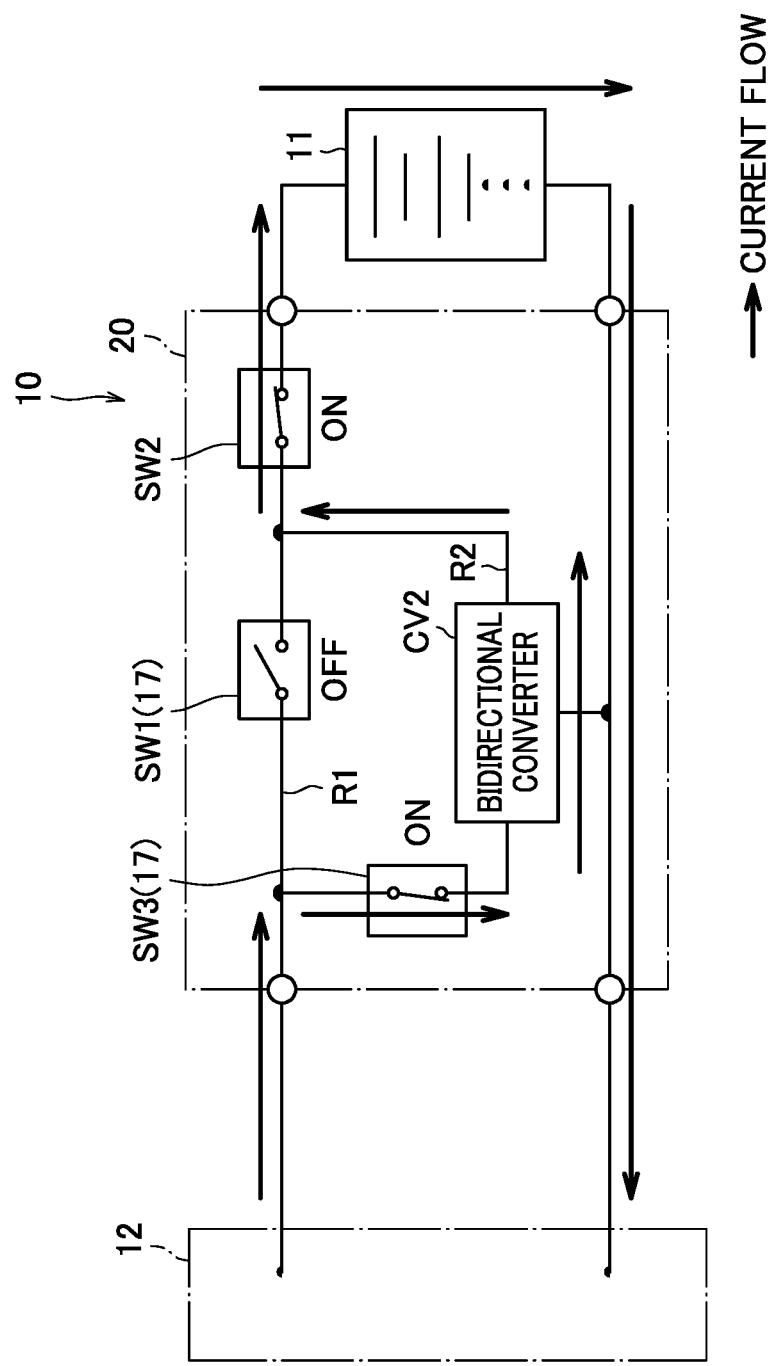
FIG. 16 is a diagram illustrating the operation of the path selector and the flow of the charging current when the secondary battery is charged by using a bypass path in the voltage adjuster in the fourth embodiment.

FIG. 16 is a diagram illustrating the operation of the path selector 17 and the flow of the charging current when the secondary battery 11 is charged by using the bypass path R2 in the voltage adjuster 20 in the fourth embodiment. As illustrated in FIG. 16, in the case of charging the secondary battery 11 by using the bypass path R2, the controller 16 turns off the switching element SW1 and turns on the switching elements SW2, SW3. As a result, as illustrated in FIG. 16, the charging current is input from the input/output terminal 12 to the secondary battery 11 through the bypass path R2. At this time, when the charging voltage of the charging power source 3 does not correspond to the secondary battery 11, the controller 16 operates the converter CV2. Thus, the voltage adjuster 20 in the fourth embodiment can adjust the charging voltage of the charging power source 3 to the predetermined voltage corresponding to the secondary battery 11. That is, as in the first to third embodiments, the battery unit 10 in the fourth embodiment can charge the secondary battery 11 with the charging voltage that corresponds to the secondary battery 11.

In the battery unit 10 of the fourth embodiment, as in those of the first to third embodiments, assuming that the converter CV2 is an insulated bidirectional converter, even when a large amount of noise is contained in the electric power input from the input/output terminal 12, the noise can be removed by the electric power passing through the converter CV2.

Figure 17:
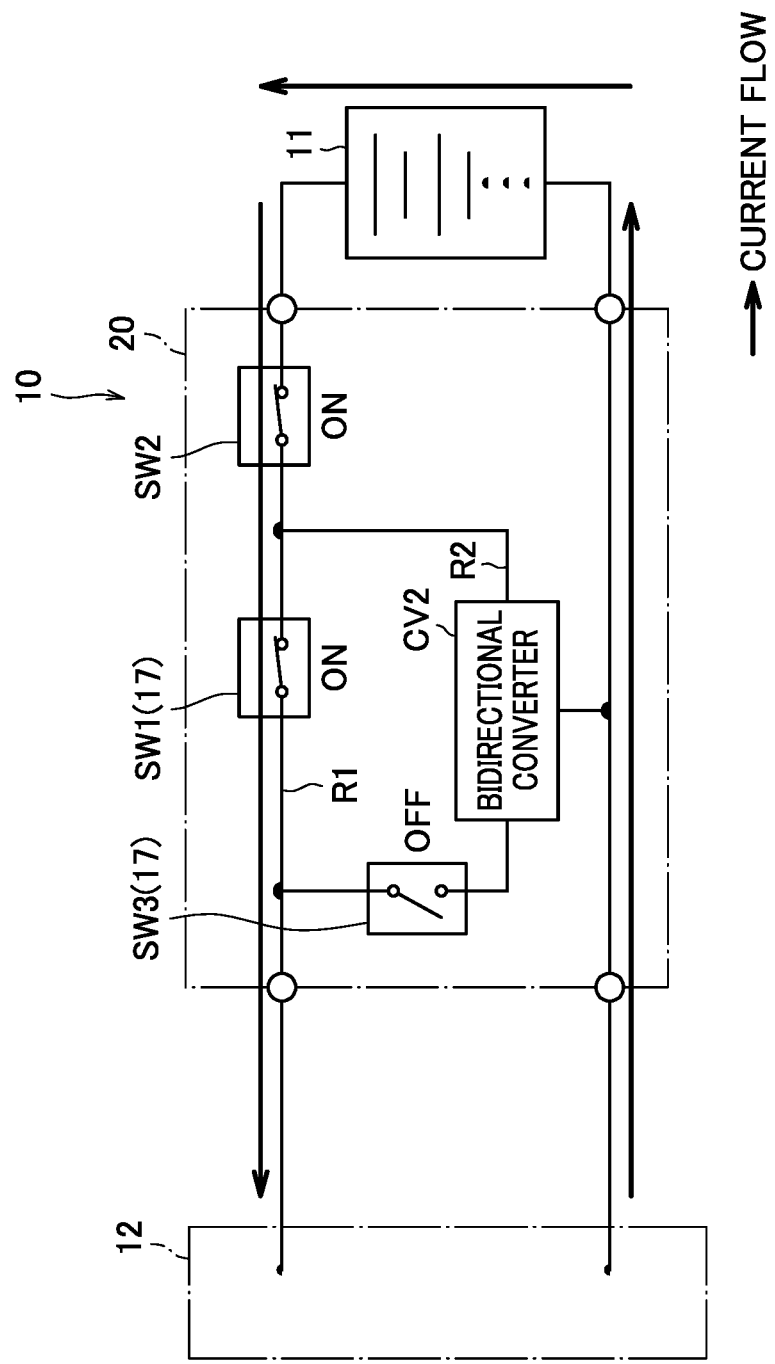
FIG. 17 is a diagram illustrating the operation of the path selector and the flow of an output current when electric power is output from the secondary battery to the external device by using a current path in the voltage adjuster in the fourth embodiment.

FIG. 17 is a diagram illustrating the operation of the path selector 17 and the flow of the output current when the electric power is output from the secondary battery 11 to the external device 2 by using the current path R1 in the voltage adjuster 20 in the fourth embodiment. As illustrated in FIG. 17, in the case of outputting the electric power accumulated in the secondary battery 11 to the external device 2, the controller 16 turns on the switching elements SW1, SW2 and turns off the switching element SW3. Thus, the battery unit 10 in the fourth embodiment can output the electric power accumulated in the secondary battery 11 to the external device 2 through the current path R1.

Figure 18:
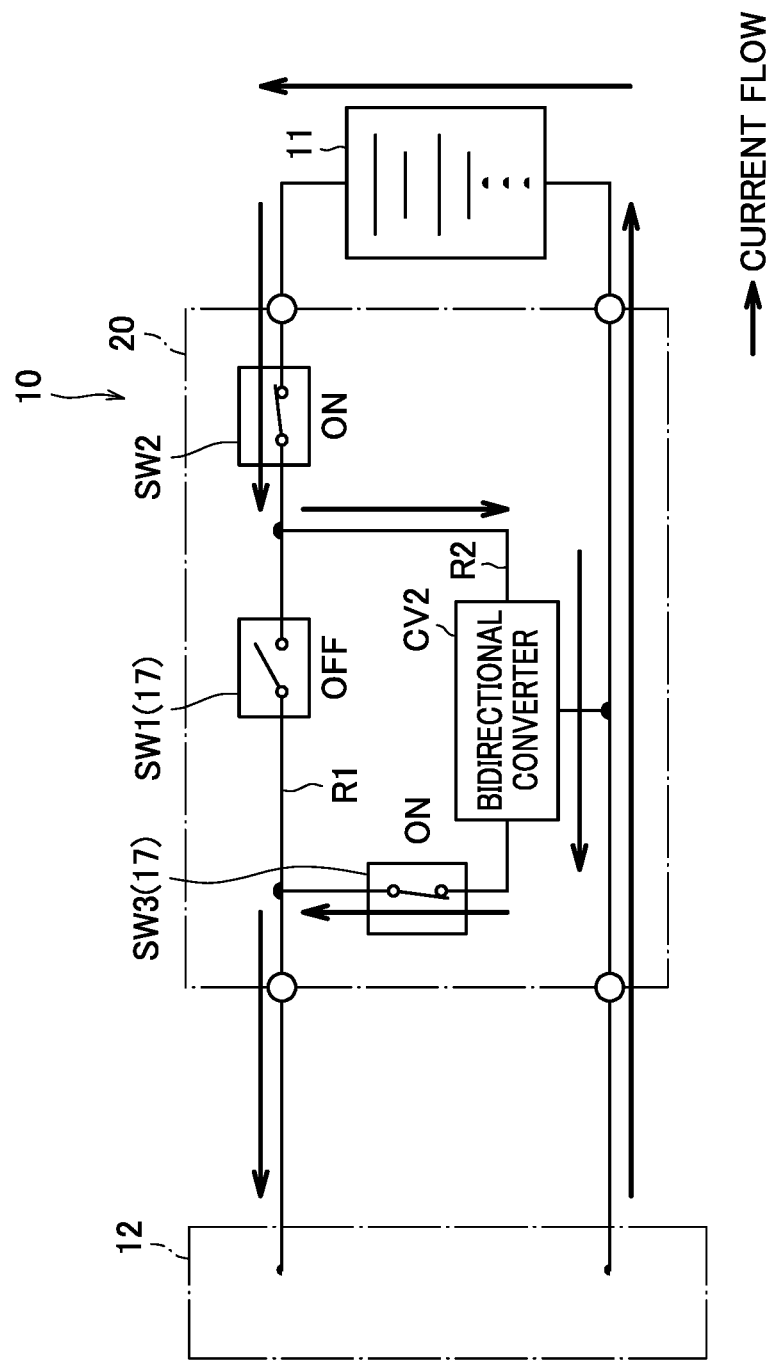
FIG. 18 is a diagram illustrating the operation of the path selector and the flow of the output current when the electric power is output from the secondary battery to the external device by using a bypass path in the voltage adjuster in the fourth embodiment.

FIG. 18 is a diagram illustrating the operation of the path selector 17 and the flow of the output current when the electric power is output from the secondary battery 11 to the external device 2 by using the bypass path R2 in the voltage adjuster 20 in the fourth embodiment. As illustrated in FIG. 18, in the case of outputting the electric power accumulated in the secondary battery 11 to the external device 2 by using the bypass path R2, the controller 16 turns off the switching elements SW1 and turns on the switching elements SW2, SW3. At this time, when the external device 2 does not correspond to the output voltage of the secondary battery 11, the controller 16 operates the converter CV2. Thus, the voltage adjuster 13 in the fourth embodiment can adjust the charging voltage of the charging power source 3 to the predetermined voltage corresponding to the secondary battery 11 through the bypass path R2. That is, as in the second embodiment, the battery unit 10 in the fourth embodiment can output the electric power accumulated in the secondary battery 11 to the external device 2 with the output voltage that corresponds to the external device 2.

In the battery unit 10 of the fourth embodiment, as in that of the second embodiment, assuming that the converter CV2 is an insulated bidirectional converter, even when a large amount of noise is contained in the electric power output from the secondary battery 11, the noise can be removed by the electric power passing through the converter CV2.

Note that the voltage adjusters 13, 18, 19, 20 illustrated in the first to fourth embodiments are merely illustrated as examples, and components such as the converters CV1, CV2, the diodes D1, D2, the switching elements SW1, SW2, SW3, and the relay switch SWR may be combined to achieve a voltage adjuster capable of performing at least one of the adjustment of the charging voltage and the removal of noise during the charge of the secondary battery 11 and the adjustment of the output voltage and the removal of noise during the discharge of the secondary battery 11.

Conclusion

With the above configuration, the battery unit 10 according to the present embodiment can charge the secondary battery 11 with the charging voltage that corresponds to the secondary battery 11. The battery unit 10 according to the present embodiment can output the electric power accumulated in the secondary battery 11 to the external device 2 with the output voltage that corresponds to the external device 2. Further, in the battery unit 10 according to the present embodiment, the charging path and the discharging path are formed of common circuit wiring, so that it is possible to simplify the circuit while preventing an increase in the number of components.

It is thus possible to achieve the battery unit 10, which is highly versatile compared to the conventional battery unit, and the power storage system 1 including the battery unit 10.

Note that the charging power source 3 in the present embodiment is provided in the power storage system 1. However, the charging power source 3 in the present embodiment is not limited thereto. For example, the charging power source 3 in the present embodiment may be an external power source provided outside the power storage system 1.

The term "predetermined processor" used in the above description means, for example, a microcomputer-dedicated or general-purpose processor, an application-specific integrated circuit (ASIC), a programmable logic device (e.g., a simple programmable logic device (SPLD), a complex programmable logic device (CPLD), a field-programmable gate array (FPGA), or the like. Each component (each processing unit) of the present embodiment is not limited to a single processor but may be achieved by a plurality of processors.

While the embodiments of the present disclosure have been described above, the embodiments have been presented as examples and are not intended to limit the scope of the disclosure. These new embodiments can be implemented in various other forms, and various omissions, substitutions, and modifications can be made without departing from the scope of the disclosure. The present embodiments and the modifications thereof are included in the scope and the gist of the disclosure and are also included in the scope equivalent to the disclosure described in the claims.

EXPLANATION OF REFERENCE SIGNS 1 power storage system
2 external device
3 charging power source (external power source)
10 battery unit
11 secondary battery
12 input/output terminal
13, 18, 19, 20 voltage adjuster
14 voltage detector
15 current detection resistor
16 controller
17 path selector
R1 current path
R2 bypass path
SW1, SW2, SW3 switching element
SWR relay switch

What is claimed is:
1. A battery unit comprising:
a chargeable/dischargeable and removable secondary battery;
an input/output terminal connected to an external power source and an external device;
a charging path for inputting electric power, supplied from the external power source via the input/output terminal, to the secondary battery;
a discharging path for outputting electric power, accumulated in the secondary battery, to the external device via the input/output terminal;

a voltage adjuster that is provided in the charging path and the discharging path and is configured to adjust a charging voltage of the external power source to a predetermined voltage corresponding to the secondary battery to output electric power received as an input via the input/output terminal, or adjust an output voltage of the secondary battery to a predetermined voltage corresponding to the external device to output electric power received as an input from the secondary battery, to the external device via the input/output terminal; and a controller configured to control an operation of the voltage adjuster in accordance with charge or discharge of the secondary battery, wherein:

the charging path and the discharging path are formed of common circuit wiring, and the voltage adjuster has:
- a current path connecting one end on the input/output terminal side and the other end on the secondary battery side,
- a bypass path of the current path,
- a converter provided in the bypass path and capable of changing input electric power to a predetermined voltage corresponding to the secondary battery or a predetermined voltage corresponding to the external device in accordance with the charge or discharge of the second battery, and
- a path selector configured to select a path to be used out of the current path or the bypass path in accordance with the charge or discharge of the secondary battery.

2. The battery unit according to claim 1, wherein:

the path selector includes:
- a first diode provided in the bypass path and having an anode connected to the input/output terminal side and a cathode connected to the secondary battery side,
- a second diode provided in the current path between a branching point and a converging point of the current path and the bypass path and having an anode connected to the secondary battery side and a cathode connected to the input/output terminal side, and
- a switching element that is provided in the current path between the branching point and the converging point of the current path and the bypass path, and the controller controls on/off of the switching element in accordance with the charge or discharge of the secondary battery.

3. The battery unit according to claim 1, wherein:

the path selector includes a first switching element provided in the bypass path and a second switching element provided in the current path, and the controller controls on/off of the first switching element and the second switching element in accordance with the charge or discharge of the secondary battery.

4. A power storage system comprising:

the battery unit according to claim 1; and a charging power source configured to supply electric power to at least one of the battery unit or the external device.

5. The battery unit according to claim 1, wherein the controller is further configured to:

determine whether or not the external power source is operating normally based on an input voltage received from a voltage detector and on an input current received from a current detection resistor; and control the operation of the voltage adjuster to discharge the secondary battery when the external power source is not operating normally.

6. The battery unit according to claim 5, wherein the controller is further configured to:

determine whether or not the external power source has been restored based on the input voltage received from the voltage detector and on the input current received from the current detection resistor; and control the operation of the voltage adjuster to charge the secondary battery once the external power source has been restored.

7. The battery unit according to claim 1, wherein the controller is further configured to determine a state of charge and a degree of degradation of the secondary battery based on a temperature from a temperature detector in the secondary battery.

8. A method for charging/discharging a chargeable/dischargeable and removable secondary battery, the method comprising:

adjusting a charging voltage of an external power source, via a voltage adjuster, to a predetermined voltage corresponding to the secondary battery, wherein the external power source supplies electric power to the secondary battery and to an external device;

charging the secondary battery, via the external power source;

detecting an input voltage via a voltage detector;

detecting an input current via a current detection resistor;

determining whether the external power source is operating normally, via a controller, based on the input voltage and the input current;

adjusting an output voltage of the secondary battery to a predetermined voltage corresponding to the external device, and outputting the electric power to be output from the secondary battery to the external device, based on whether the external power source is operating normally.

9. The method of claim 8, further comprising detecting when a failure has occurred.

10. The method of claim 9, further comprising opening a switch between the voltage adjuster and the secondary battery when the failure has occurred.

11. A battery unit comprising:

a chargeable/dischargeable and removable secondary battery;

an input/output terminal connected to an external power source and an external device;

a charging path for inputting electric power, supplied from the external power source via the input/output terminal, to the secondary battery;

a discharging path for outputting electric power, accumulated in the secondary battery, to the external device via the input/output terminal;

a voltage adjuster that is provided in the charging path and the discharging path and is configured to adjust a charging voltage of the external power source to a predetermined voltage corresponding to the secondary battery to output electric power received as an input via the input/output terminal, or adjust an output voltage of the secondary battery to a predetermined voltage corresponding to the external device to output electric power received as an input from the secondary battery, to the external device via the input/output terminal;

a switching element in the charging path and the discharging path between the secondary battery and the voltage adjuster and configured to open the charging path and the discharging path when a failure occurs in the battery unit; and a controller configured to control an operation of the voltage adjuster in accordance with charge or discharge of the secondary battery, wherein:

the charging path and the discharging path are formed of common circuit wiring, and the voltage adjuster has:
- a current path connecting one end on the input/output terminal side and the other end on the secondary battery side,
- a bypass path of the current path,
- a converter provided in the bypass path and capable of changing input electric power to a predetermined voltage corresponding to the secondary battery or a predetermined voltage corresponding to the external device in accordance with the charge or discharge of the second battery, and
- a path selector configured to select a path to be used out of the current path or the bypass path in accordance with the charge or discharge of the secondary battery.

12. The battery unit of claim 11 wherein:

the converter is an insulated bidirectional converter; and the converter removes noise in electrical power passing through the converter.

13. The battery unit of claim 11, wherein the failure is a large amount of noise in an electric power output from the secondary battery.

14. The battery unit of claim 11, wherein the failure is a defect in the external device.

* * * * *